(12) United States Patent
Sung

(10) Patent No.: US 6,926,420 B2
(45) Date of Patent: Aug. 9, 2005

(54) BACKLIGHT UNIT HAVING REFLECTIVE PLATE WITH REFLECTION DOTS

(75) Inventor: Chang-Chih Sung, Tu-chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 14 days.

(21) Appl. No.: 10/417,754

(22) Filed: Apr. 16, 2003

(65) Prior Publication Data
US 2004/0125589 A1 Jul. 1, 2004

(30) Foreign Application Priority Data
Dec. 27, 2002 (TW) .......................................... 91137603 A

(51) Int. Cl.[7] ................................................ F21V 7/04
(52) U.S. Cl. .......................................... 362/31; 362/26
(58) Field of Search ..................................... 362/31, 26

(56) References Cited
U.S. PATENT DOCUMENTS

| 5,283,673 A | | 2/1994 | Murase et al. |
| 5,730,518 A | * | 3/1998 | Kashima et al. ............... 362/31 |
| 6,151,168 A | * | 11/2000 | Goering et al. ............. 359/623 |
| 6,447,136 B1 | * | 9/2002 | Liu et al. ...................... 362/31 |

* cited by examiner

Primary Examiner—Stephen Husar
Assistant Examiner—Anabel Ton
(74) Attorney, Agent, or Firm—Wei Te Chung

(57) ABSTRACT

The present invention provides a backlight unit (30) for a liquid crystal display. The backlight unit includes a light source (5), a light guide plate (6), a reflective plate (7), a diffusing plate (8) and a prism plate (9). The light guide plate includes a light incidence surface (61) adjacent to the light source. The reflective plate has a top surface (73) opposed to the light guide plate. A plurality of light reflection dots (74) are arranged on the top surface of the reflective plate. The light emitted from the backlight unit illuminates a panel, such as a liquid crystal panel, to display images.

11 Claims, 2 Drawing Sheets

BACKLIGHT UNIT HAVING REFLECTIVE PLATE WITH REFLECTION DOTS

BACKGROUND OF THE INVENTION

1. Field of the Invention

The present invention relates to a backlight unit providing illumination for a liquid crystal display.

2. Description of Related Art

Recently, liquid crystal display devices have been remarkably improved, and their market has been steadily growing because they can save installation space by virtue of their thickness, and they can also save power.

Prior art liquid crystal display devices comprise a liquid crystal panel including a liquid crystal layer interposed between a pair of glass substrates, and two polarizing plates, which are attached on opposite sides of the glass substrates. The polarization state of linearly-polarized light incident upon the liquid crystal panel is modulated by the liquid crystal layer, whereby images are displayed.

A transmission-type liquid crystal display device, which is currently the dominating device on the market, requires illumination from its rear. Therefore, a backlight unit is an essential element for a transmission-type liquid crystal display device.

A conventional backlight unit 20, as shown in FIG. 4, consists of a light source 1, a light guide plate 2 having a first end surface 21 located in the vicinity of the light source 1, a diffusing plate 3 arranged on a top surface of the light guide plate 2 and a reflective plate 4 disposed on a bottom surface 23 of the light guide plate 2. A plurality of reflection dots 24 are disposed on the bottom surface 23 of the light guide plate 2. The light guide plate 2 also comprises a second end surface 22 opposite to the first end surface 21 and a top surface 25 opposite to the bottom surface 23. The conventional backlight unit 20 operates in the following manner: first, light beams emitted from the light source 1 enter into the light guide plate 2 through the first end surface 21 thereof, and are then transmitted to the second end surface 22 after being sequentially reflected by the top surface 25 and the bottom surface 23 (reflecting surface). During the transmission, most of the light beams emit from the top surface 25 and a few of the light beams emit from the bottom surface 23 and are reflected by the reflective plate 4 back into the light guide plate 2. The light beams emitting from the top surface 25 enter into the diffusing plate 3 and are diffused by the diffusing plate 3. Then the light beams emerge from the diffusing plate 3 so that the backlight unit 20 is usable as a surface light source.

However, such a backlight unit 20 using the light guide plate 2 having the reflection dots 24 on the bottom surface 23 is subject to some problems. First, because printing the reflection dots 24 on the light guide plate 2 involves use of water, which is absorbed by the light guide plate 2, and the light reflection dots 24 are only printed on one side of the light guide plate 2, the light guide plate 2 will change its shape due to water absorption on only one side. Thus, the light guide plate 2 needs to be dried after the reflection dots 24 are printed on its bottom surface 23. This results in an increase in the cost of the backlight unit 20. Second, the light guide plate 2 may be damaged during the course of printing the reflection dots 24 on the light guide plate 2, which also increases the cost of the backlight unit 20.

SUMMARY OF THE INVENTION

An object of the present invention is to provide a backlight unit which is low in cost.

A backlight unit in accordance with the present invention comprises a light source, a light guide plate, a reflective plate, a diffusing plate and a prism plate. The light guide plate includes a light incidence surface adjacent to the light source and an emission surface. The reflective plate has a top surface facing toward the light guide plate and a plurality of light reflection dots arranged on the top surface.

The light source projects light into the light guide plate through the light incidence surface, so that the light propagates through the light guide plate and is scattered by the reflection dots on the top surface of the reflective plate. The scattered light then is transmitted through the emission surface and through the diffusing plate and the prism plate to provide a uniform illumination output.

Other objects, advantages, and novel features of the present invention will become more apparent from the following detailed description when taken in conjunction with the accompanying drawings.

DETAILED DESCRIPTION OF THE INVENTION

Figure 1:
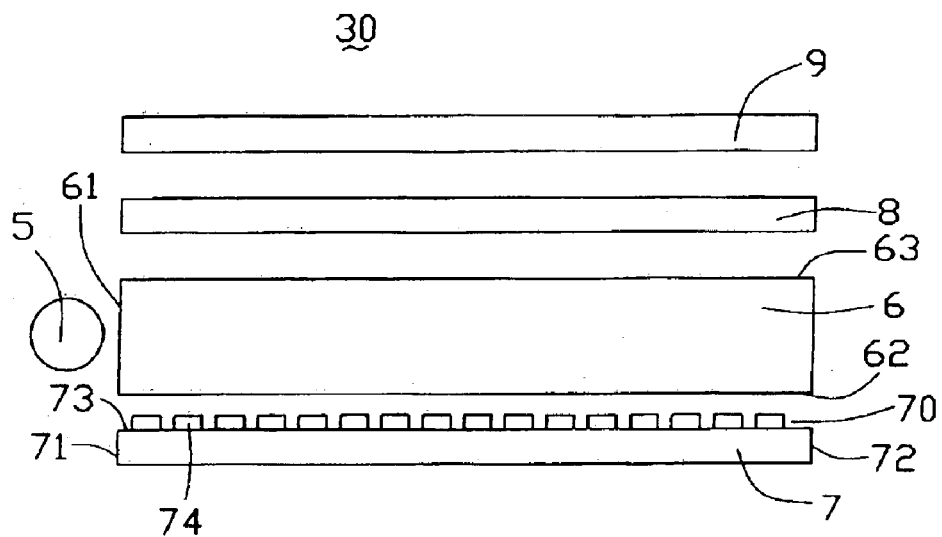
FIG. 1 shows an exploded, cross-sectional view of a backlight unit of the present invention.

FIG. 1 shows an exploded, cross-sectional view of a backlight unit 30. The backlight unit 30 is used to provide illumination for a liquid crystal panel (not shown). The backlight unit 30 comprises a light source 5, a light guide plate 6, a reflective plate 7, a diffusing plate 8 and a prism plate 9. The reflective plate 7, the light guide plate 6, the diffusing plate 8 and the prism plate 9 are laminatedly arranged in order from bottom to top.

The reflective plate 7 comprises a first end surface 71, a second end surface 72 opposite to the first end surface 71 and a top surface 73. The reflective plate 7 may be, for example, a white polyethylene terephtalate (PET) sheet for effectively and irregularly reflecting light. A reflection dot pattern 70 is formed on the top surface 73 of the reflective plate 7. The dot pattern 70 is made using a screen printing technique.

Figure 2:
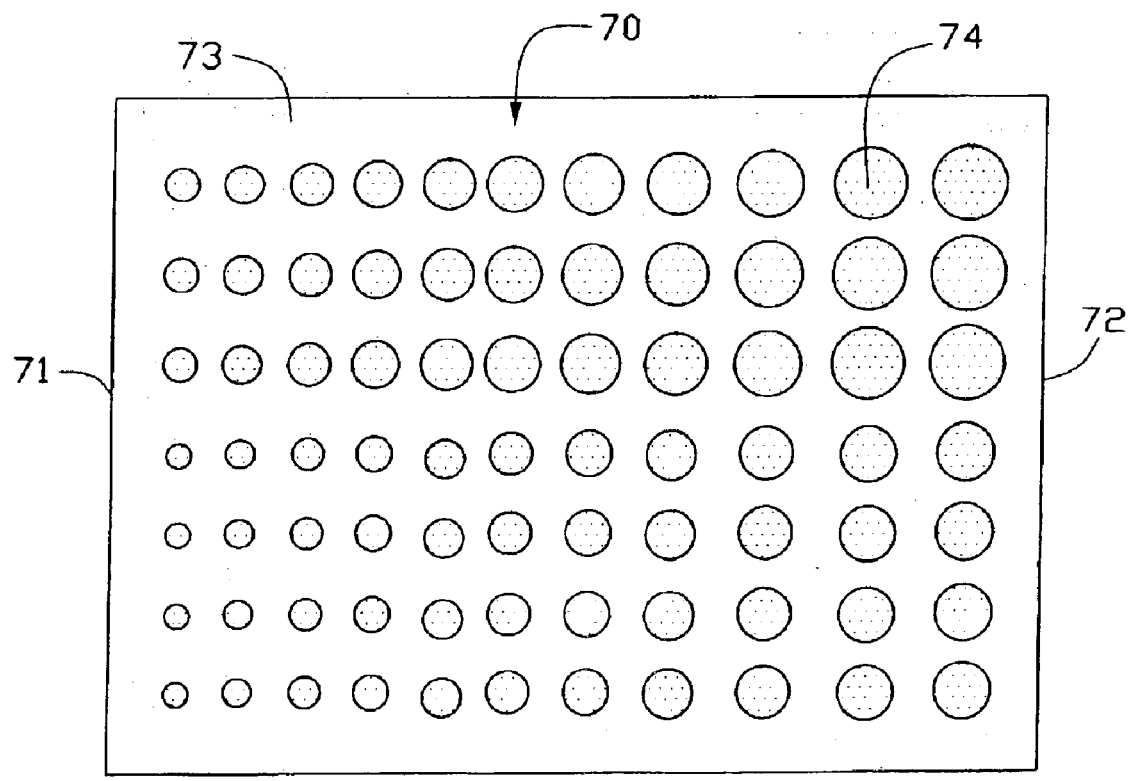
FIG. 2 shows a top plan view of a reflective plate in FIG. 1.
Figure 3:
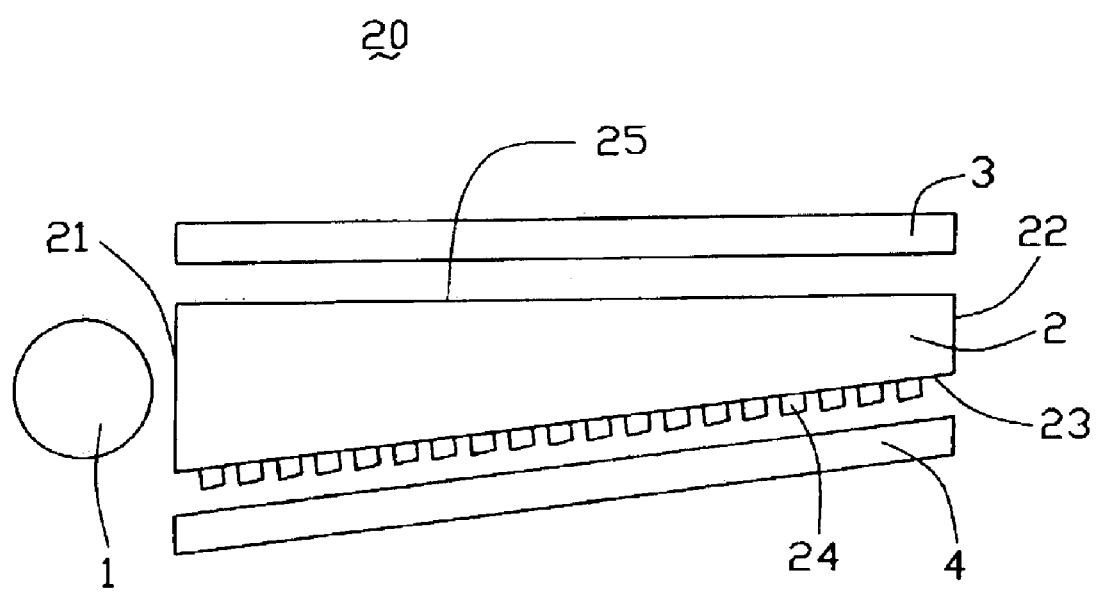
FIG. 3 shows an exploded, cross-sectional view of a conventional backlight unit.

FIG. 2 is a top plan view of the reflective plate 7, showing the pattern 70 as a matrix array of a plurality of differently sized reflection dots 74. Along each row of the matrix, the size of the reflection dots 74 increases as a function of distance from the first end surface 71 to the opposite second end surface 72. Along each column of the matrix, the sizes of the reflection dots 74 arc equal in the upper half of the column, and equal in the lower half of the column. However, the dot size in the upper half of each column is greater than the dot size in the lower half of the column. By this means, an amount of light reflected by the reflection dots 74 in each column is equal to that reflected by the reflection dots 74 in other columns.

The light guide plate 6 includes a light incidence surface 61, an emission surface 63 and a bottom surface 62. A material of the light guide plate 6 is not particularly limited, so long as it has efficient transmission capability. Acceptable materials include acrylic resins, such as polymethyl methacrylate (PMMA). A cross section of the light guide plate 6 is rectangular. Alternately, the light guide plate 6 can also be wedge-shaped. The bottom surface 62 is smooth.

When the backlight unit 30 is assembled, the light source 5 is located beside the light incidence surface 61 of the light guide plate 6, so that light enters the light guide plate 6 through the light incidence surface 61, and the emission surface 63 gives an illumination output. The reflective plate 7 is disposed on the bottom surface 62 of the light guide plate 6, and the first end surface 71 of the reflective plate 7 is near the light source 5. The diffusing plate 8 is disposed on the emission surface 63 of the light guide plate 6, for diffusing the light emitted from the light guide plate 6. The prism plate 9 is attached to the diffusing plate 8.

In use, the light source 5 projects light into the light guide plate 6 through the light incidence surface 61. The light propagates through the light guide plate 6, and is scattered by the reflection dots 74 on the top surface 73 of the reflective plate 7. Then the scattered light is output through the emission surface 63, the diffusing plate 8, and the prism plate 9 to provide an illumination output. Since a size of the reflection dots 74 increases along the rows of the matrix from the first end surface 71 and an intensity of the light decreases as it propagates in the light guide plate 6, the amount of light reflected by the reflection dots 74 in each column is equal to that reflected by the reflection dots 74 in other columns. Thus, the backlight unit 30 enhances illumination uniformity of a panel, such as a liquid crystal display panel.

In this present invention, the reflection dots 74 are arranged on the reflective plate 7 instead of on the light guide plate 6. Advantages of the present invention over the prior art include the following: the reflective plate 7 costs less than the light guide plate 6, so even if the reflective plate 7 is damaged during the making of the reflection dots 74 on the reflective plate 7, the damage is less costly to replace. Therefore, the production cost of the backlight unit 30 is less.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight unit comprising:

a light source emitting light beams;

a light guide plate for transmitting the light beams, which has a light incidence surface located beside the light source for receiving the light beams and a bottom surface; and a reflective plate disposed on the bottom surface of the light guide plate and having a top surface facing toward the light guide plate;

wherein the reflective plate comprises a plurality of light reflection dots formed on the top surface thereof, for reflecting light beams emitting from the bottom surface of the light guide plate back to the light guide plate.

2. The backlight unit as claimed in claim 1, wherein the reflection dots are arranged in a matrix array, and the size of the reflection dots in each row of the matrix array increases as a function of distance from the light source.

3. The backlight unit as claimed in claim 2, wherein the size of the reflection dots in each column of the matrix array is equal in an upper portion of the top surface, and the size of the reflection dots in each column of the matrix array is equal in a lower portion of the top surface.

4. The backlight unit as claimed in claim 1, wherein the reflective plate is made of white PET.

5. The backlight unit as claimed in claim 1, wherein the light guide plate is made of PMMA.

6. The backlight unit as claimed in claim 1, wherein the light guide plate is a wedge-shaped plate.

7. The backlight unit as claimed in claim 1, wherein the light guide plate is a rectangular box-shaped plate.

8. The backlight unit as claimed in claim 1, wherein the backlight unit further comprises a diffusing plate disposed on a top surface of the light guide plate for diffusing the light beams.

9. The backlight unit as claimed in claim 8, wherein the backlight unit further comprises a prism plate attached to the diffusing plate.

10. A backlight unit comprising:

a light source for emitting light beams;

a light guide plate located beside the light source for transmitting the light beams, said light guide plate defining a bottom face thereon; and a reflective plate located below the bottom face and defining thereon a top face facing said bottom face; wherein a plurality of light reflection dots are attached to the top face of the reflective plate.

11. A method of making a backlight unit, comprising the steps of:

providing a light source;

locating a light guide plate beside said light source;

providing a reflective plate with a plurality of light reflection dots associatively attached on a top face of said reflective plate; and stacking said light guide plate and said reflective plate together under a condition that the light reflection dots abut against said light guide plate.

* * * * *